Patented Sept. 1, 1953

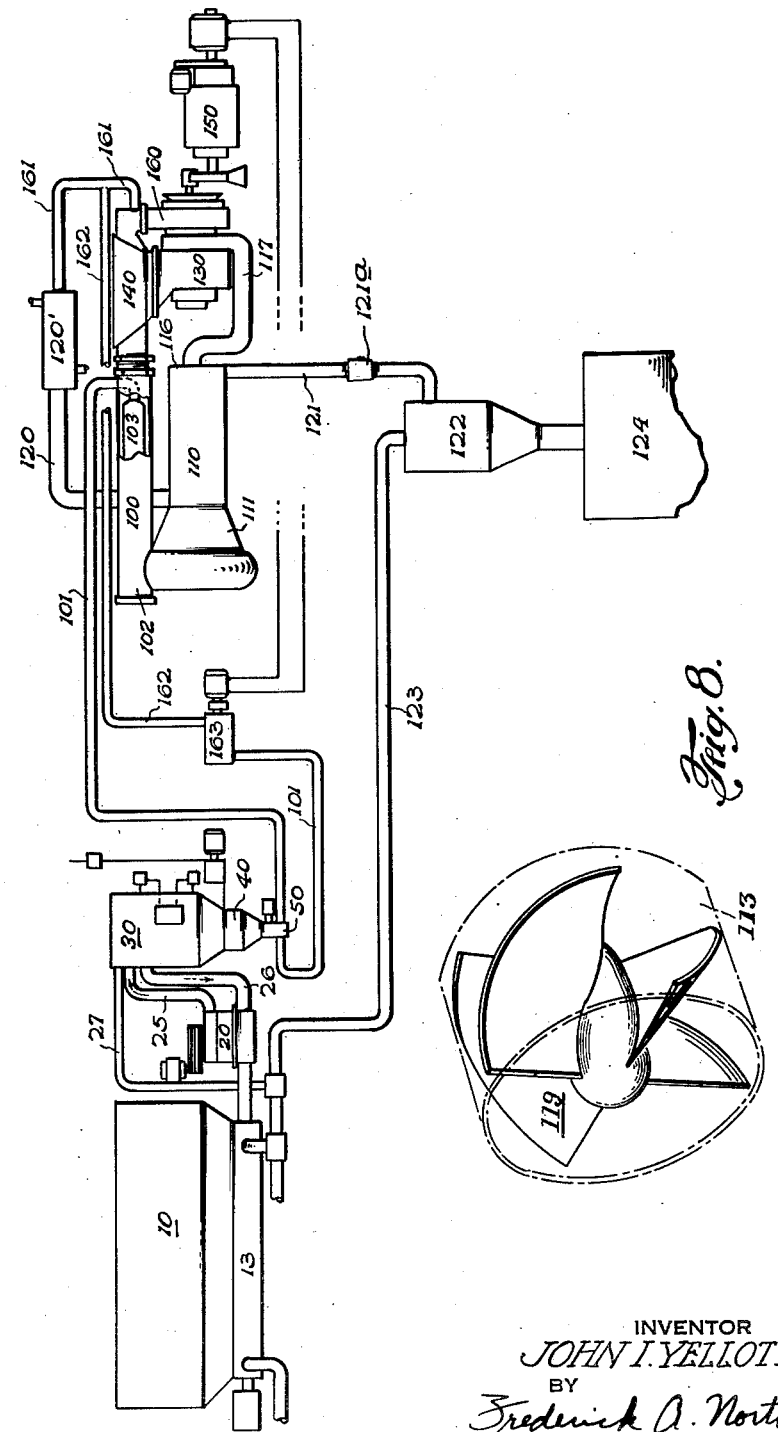

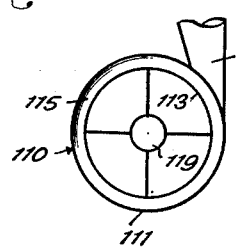
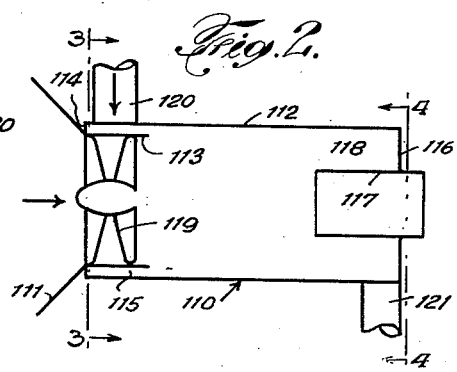
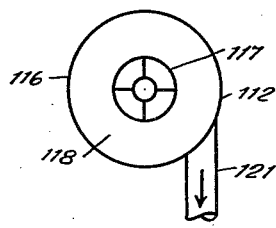
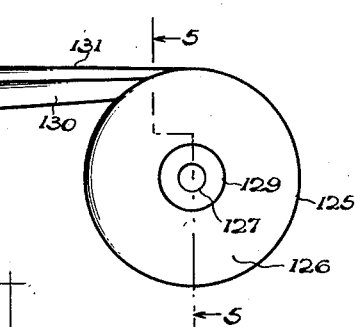
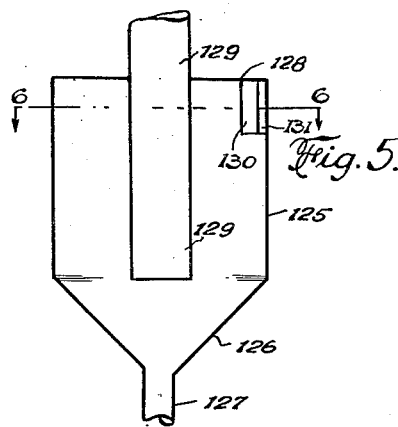
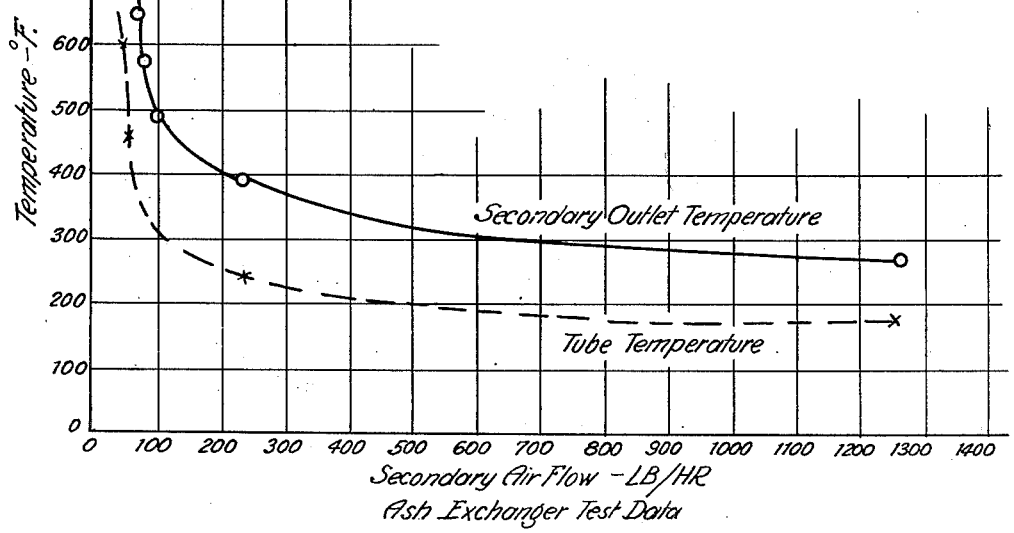

2,650,675

UNITED STATES PATENT OFFICE 2,650,675

METHOD AND APPARATUS FOR THE SEPARATION OF PARTICULATE MATERIAL FROM ENTRAINING GASEOUS FLUIDS

John I. Yellott, Baltimore, Md., assignor to Bituminous Coal Research, Inc., Washington, D. C., a corporation of Delaware Application March 9, 1950, Serial No. 148,594

13 Claims. (Cl. 183—80)

This invention relates to method and apparatus for the separation of solid and liquid particles or droplets from industrial gases, including furnace gases, fumes from steel plants and foundries, and installations discharging air or gas-borne smokes and fumes in the atmosphere. A particular feature of the invention is concerned with the incorporation of such an apparatus in coal-burning gas turbine power plants as ash exchangers for the transfer of hot incandescent combustible solid residues from motive gas fluids to lower temperature, secondary gas streams in which they are entrained and removed.

A feature of the present invention is the incorporation of the improved ash exchanger herein in a coal burning gas turbine power plant of the generating electric type, particularly adapted for use in generating electric locomotives, whereby direct and positive removal and quenching of ash and incandescent combustible particles from turbine motive gas is directly effected in a minimum size apparatus.

In pressurized combustion systems of the type used for generating pressurized heated motive fluids for gas turbines, and particularly where powdered coal is used as a combustible, the accelerated flow of combustion gases in the combustor reduces the combustion time or dwell of the combustible particles in the combustion zone to a point where the solid residue contains up to 50% combustible matter. These residual particles have been found to burn in the ash separation equipment, unless they are cooled down below the combustion point. A safe temperature to which such particles or combustible masses can be lowered, without danger of further combustion, or afterburning is about 400° F. This is usually accomplished by mixing a very large quantity of secondary air with the ash-carrying primary air, thereby bringing down the temperature of the entire mixture.

The difficulties inherent in the use of powdered coal as a combustible for the generation of pressurized motive fluid for gas turbines are compounded when such gas turbine power plants are incorporated in locomotives. Here, the available space restricts the size of equipment to a minimum, with the result that smaller combustors and ash handling equipment are necessary. With reduction in size of ash separating equipment it is not possible to effect the rapid quenching and removal of ash and combustible solids from pressurized gas streams discharged from combustors through the ash separators to the gas turbines, and severe damage to such equipment results.

I have now found that these inherent difficulties in the operation of powdered coal burning gas turbine power plants of limited size, due to space limitations, can be obviated by specially treating the hot motive fluid with its entrained ash, and coarse combustible particles, as the gas stream is discharged from the combustor, whereby the coarse, hot, still burning combustible particles are simultaneously removed from the hot gas stream and cooled, and without requiring any appreciable dilution with cooling air of the hot motive fluid fed to the turbine.

It is, therefore, among the features of novelty and advantage of the present invention to provide an improved pulverized coal-burning gas turbine power plant, specially adapted for use in generating electric locomotives, and incorporating an ash and incandescent combustible separating apparatus for combustion gases from pressurized combustors using pulverulent, air-borne fuels, in which a primary hot air stream is stripped of its hot or incandescent ash and combustible particles, which are then transferred to a colder, secondary air stream, of considerably smaller volume, and without substantial mixing with and dilution of the primary hot air stream.

It is also among the features of novelty and advantage of the present invention to provide an ash exchanger in which a spinning, pulverulent solids-bearing, primary hot air stream is freed of its contained ash and combustibles by transfer into a sheath comprising a secondary envelope or cooler air stream having a rotative velocity equivalent to that of the primary hot air stream, whereby the primary hot air stream is stripped of solid particles and is discharged to a turbine, or other use device or system, and the secondary air stream carries off the separated particles at a temperature far below that which would normally obtain, and in a condition in which they can be safely handled or stored.

Other features of novelty and advantage of the present invention include the incorporation and use of the novel exchanger in industrial plants such as steel mills, iron, steel and brass foundries, and the like, where molten metal droplets and metallic and oxide particles are carried off in the fumes, and wherein molten and incandescent metals are quenched and chilled before they can be impacted against off-take duct walls with damage thereto. Other features of novelty include the incorporation of the novel separator herein in ventilating systems for flour mills, grain elevators, and the like, where flammable dusts are generated.

The above and other desirable features of novelty and advantage of the present invention will be more clearly understood by reference to the accompanying drawings, in which is shown a coal-burning, gas turbine power plant incorporating a novel separation apparatus according to the present invention.

In the drawings, like numerals refer to similar parts throughout the several views, of which Figure 1 is a schematic showing of a generating electric, gas turbine power plant incorporating pulverized coal burning equipment, including an atmospheric mill feeding through a coal pump into a pressurized combustion system, together with an ash removal system in the turbine inlet line incorporating the novel ash exchanger herein for the simultaneous removal and quenching of hot ash and combustible solids from the gas turbine motive gas supply;

Fig. 2 is a longitudinal vertical section of the improved ash exchanger of the system of Fig. 1;

Fig. 3 is a cross-section taken on line 3—3 of the device of Fig. 2, showing hot gas and cooling air inlets;

Fig. 3A is a perspective view of the inlet of the device of Fig. 2, showing the central bullet and vanes;

Fig. 4 is a cross-section taken on line 4—4 of Fig. 2, showing the discharge end of the ash exchanger;

Fig. 5 is a vertical section through a cyclone separator, incorporating the improvements of the present invention;

Fig. 6 is a plan view of the separator of Fig. 5;

Fig. 7 is a graph showing the temperature of the effluent secondary air flow, and the temperature of the tube wall plotted against the quantity of incoming secondary air; and Fig. 8 is a perspective view of the spinner means of Fig. 2.

Turning now to the drawings, and with particular reference to the showing of Fig. 1, there is shown a power plant of the gas turbine driven, generating electric type, the major features of which are disclosed and claimed in my co-pending application Seral No. 196,288, filed November 17, 1950, for Coal-Burning Gas Turbine Power Plant With Atmospheric Pressure, Coal Preparation and Supply System and Continuous Ash Blowdown With Heat Recovery. In this system, bunker coal is preliminarily dried, pulverized in an atmospheric mill, and fed to an atmospheric storage tank. From this tank it is fed, at a controlled rate, into the hopper of a special, rotary solids transfer pump, which discharges the pulverized coal into the pressurized combustive air line of the combustor of the gas turbine system at a predetermined, controlled rate.

The improved system herein comprises a pulverized coal preparation system including a coal bunker 10, an atmospheric pulverizer or mill 20, an atmospheric storage tank 30 for pulverized coal, a variable solids feeder 40, and a rotary solids transfer pump 50. The system also includes a combustor 100, discharging cleaned gaseous motive fluid through an ash exchanger, designated generally by the numeral 110, to a gas turbine 130 having an exhaust duct or stack 140, which incorporates a regenerator. A primary air compressor 160 is coupled to and driven by the turbine, as is an electric generator 150.

Coal is preliminarily crushed in the stoker conveyor 13 at the bottom of the bunker and is fed to mill 20, wherein it is pulverized and carried, in an air-borne stream through pipe 25, to a separator mounted in the top of tank 30, the bottom of which serves as a storage tank. The air from the separator is recycled through line 26 to the mill, a portion being vented through the vent line, all as described in my said application Serial No. 196,288, filed November 17, 1950. The pulverized coal from the storage tank or container 30 discharges through feeder 40, rotary pump 50, and combustive air feed line 101 to the combustion chamber 103, the combustor having an outer shell 102. The combustive air feed line 101 is fed by air pump 163 which takes low pressure air from primary compressor 160 through branch line 162 of line 161. The line 161 supplies low pressure air from compressor 160 to the secondary air line 120 of the novel ash exchanger 110, as will be described more in detail hereinafter. The products of combustion, plus air from low pressure compressor 160, are discharged through the ash exchanger 110 to the gas turbine. The ash separated from the ash exchanger discharges through a pressure reducer 121a into a cyclone separator 122, the clean gas being delivered through line 123 to the feeder trough 13 of the coal bunker to serve as drying air. The ash from the separator, being relatively cool, is discharged into a subjacent container 124, whence it is removed as desired.

Referring more particularly to Figs. 2 to 6 of the drawings, the improved ash exchanger 110 of the present invention will be seen to comprise an inlet cone 111, discharging the ash-bearing motive fluid from combustor 100 to a cylindrical casing 112, an inlet duct 113 secured thereto and spaced therefrom by a flat annulus or orifice ring 114, forming the closed end of a narrow annular chamber 115 defined by duct 113 and the adjacent end of the inside wall of casing 112. At the opposite end of the casing an orifice ring 116 mounts an outlet duct 117, coaxial with inlet duct 113, and forms an annular chamber 118 with the adjacent portion of the casing 112. The inlet duct 113, as shown, is in fluid communication with the discharge end of inlet cone 111, and mounts a spinner element 119, which may consist, as shown, of a central bullet, and spiral vanes secured to the bullet and to the inlet 113.

The secondary air system comprises a tangential secondary air inlet 120 discharging, cospirally with the primary air, into annular chamber 115, and a tangential secondary air outlet 121 forming the discharge from the annular chamber 118.

The tangential air inlet line 120 is tapped into the high pressure air line 161, from compressor 160. An intercooler 120' serves to cool the air delivered through line 120 to the desired operating temperature. While the secondary air for the ash exchanger has been shown to be derived from the main compressor 160, and cooled, it will be appreciated that a separate air source, of the desired temperature, may be used.

The ash exchanger herein is very effective, as is shown in the graph of Fig. 7, in which the temperature of the dust laden exit stream is plotted against the quantity of secondary air required to reduce the outlet temperature of the secondary, dust-laden stream, to the desired value.

The operation of the device of Fig. 2 herein is simple, and its space requirements are minimum. Thus, a unit having an overall length of 2½ to 3 feet, with a casing diameter of the order of 8½ to 9 inches, will be effective for a throughput of up to 1500 lbs./hr. primary air flow at 850° F., plus a secondary air flow of up to 750 lbs./hr.

The ash exchanger is operated in the following manner: The dust-laden, hot gases discharge through the spinner into the casing with a rotative velocity sufficient to whirl the solid particles outwardly against the wall of the casing. The colder, secondary gas, being introduced tangentially into the secondary air inlet chamber, is projected into the casing in the same direction and with a rotative velocity of the same order of magnitude as that of the spinning primary, dust-laden hot gas. Because of its greater density, the cold gas tends to hug the wall of the casing, as a sheath or envelope, while the lighter, hot gas tends to stay in a central core. The dust, being far more dense than either of the gas streams, is projected out into the cold gas sheath and is carried away by this secondary stream, wherein it is reduced to a temperature far below that which it would normally have. Referring again to the graphs, it is seen that a primary air stream of 1463 lb./hr. at 850° F., when treated with a secondary stream of approximately 200 lbs./hr. at 70° F., or about 15%, yields an outlet temperature for the secondary stream of approximately 400° F., or about one-half as great as that of the primary stream.

Referring now to Figs. 5 and 6, the improvements of the present invention are shown incorporated in a vertical cyclone separator in which the dust is carried off at the bottom with some of the gas. In this construction the separator comprises the usual cylindrical chamber 125, having a conical bottom 126 terminating in a separated solids or dust line 127, and a closed top 128 mounting air discharge duct 129, which, as shown, depends well into the chamber 125 and below the primary and secondary gas inlets. The primary gas inlet 130, for the dust-carrying gas stream, discharges tangentially into the top of the separator chamber, as does the adjacent secondary gas inlet 131, which is desirably coplanar with and radially beyond the primary gas inlet. More specifically, the primary, dust-carrying core stream discharges tangentially against the inner wall of the secondary gas stream, whereby both streams are adjacent and rendered co-flowing and co-spinning, due to their common origin and direction of travel. It will be seen that the inlets 130 and 131 are essentially components of a unitary inlet device in which the two inlet streams are separated by a vertical separator in the said device.

In the cyclone separator of Figs. 5 and 6, as in the exchanger of Fig. 2, the laterally parallel and co-flowing primary and secondary gas streams are conjointly introduced into the chamber with approximately the same rotative velocity. Here again, the denser, cooler gas of the secondary stream will displace the primary, hot gas towards the center of the cyclone separator while picking up and carrying the separated solids downwardly out of the separator, the cleaned, hotter primary gas discharging upwardly through outlet duct 129 to a gas turbine or other use device.

While the preferred example of the novel ash exchanger apparatus and method herein has been described in connection with the treatment of gas turbine motive fluid comprised of combustion exhaust gases containing hot, incandescent combustible particles with a minimal amount of cold air, whereby the hot solids are transferred from the hot primary stream to the colder secondary stream, and the streams separated without substantial diffusion into each other, the invention also comprehends the treatment of primary gas streams, at atmospheric temperatures, with cooled or refrigerated secondary air, or with other quenching gases, including carbon dioxide and air mixtures thereof, as well as non-combustion supporting gases and vapors. Such use as indicated for sawmills, factories, flour mills, grain elevators, and all establishments where flammable dusts and solid particles of combustible materials are generated, at ordinary room temperatures. By reducing the temperature of the separated dusts and combustible particles below their threshhold ignition temperatures, the safety factor is multiplied without requiring any outsize installations.

As noted hereinabove, a special utility of the novel exchanger of the present invention is found in its application and use in iron and steel foundries, brass foundries, and the like. In steel mills, the Bessemer converters discharge enormous quantities of gases into the atmosphere, and these gases must be promptly removed to insure adequate ventilation. Not only are the gases fume-laden, but they carry significant quantities of liquid metal, in the form of gas-borne droplets. These gas-borne droplets cause considerable damage to off-take ducts of ventilating systems by impacting and fusing to the walls of the ducts, thereby resulting in embrittlement and erosion of the metal and rapid destruction of the ducts. By the improvements of the present invention, the fume and metal-laden off-take gases from Bessemer converters, or other like equipment, are rendered innocuous by the transfer of solid and liquid particles directly into the quenching sheath of the cooler secondary gas. Not only are smoke and fume cleaned, but as noted above, noxious vapors may be purified by incorporating special vaporous or liquid absorbents and/or reagents in the secondary gas stream, whereby the materials stripped from the primary gas stream are removed and recovered, and the secondary fluid returned to the process, or the otherwise active materials neutralized and rendered harmless, being removed in the secondary stream. Any desirable temperature differential may be maintained between the core stream and the secondary, or sheath stream, so that the quenching of incandescent material can be effected promptly, and such material maintained below the ignition or combustion threshhold temperature.

While I have described the use of cooled or refrigerated secondary air for the treatment of hot or incandescent particulate solid material and droplets transferred from a spinning core stream of gas to a co-spinning and co-flowing sheath or enveloping stream of a colder gas, the invention also comprehends the use of other quenching gases, including carbon dioxide and air mixtures, as well as non-combustion supporting gases and vapors generally, care being taken to insure that the materials of the secondary quenching stream are inert to the components of the core stream, or are capable of rendering particulate material or droplets transferred thereto, inactive or harmless by neutralization of the same and removing them.

It will now be appreciated that there has been disclosed a novel system for the transfer of particulate solid or liquid materials from an inner, low density stream to an outer, high density stream, and the separation of the two streams, whereby a minimum quantity of high density fluid is effective to entrain and quench particulate material transferred thereto from a co-flowing core stream.

It will also be appreciated that there has been provided a novel generating electric power plant, powered by a gas turbine fed with cleaned motive gas from a pulverized coal burning combustor, the ash from the products of combustion being stripped from the motive gas and cooled in a special ash exchanger by a secondary stream of cooler air, and without substantial dilution of the hot, motive fluid.

What is claimed is:

1. The method of separating particulate solids and fluid droplets from a gaseous fluid containing same, comprising establishing a primary spinning core of such material-bearing gaseous fluid within a secondary, co-flowing and co-spinning sheath of a colder gaseous fluid, whereby the said material is transferred from the primary stream to the secondary stream, and separating the said streams.

2. In a high pressure combustion system for the combustion of powdered coal and characterized by the fact that the hot gaseous discharge contains solid particles of combustible material, the improved method of cooling and separating said combustible material comprising establishing a primary hot stream of gaseous fluid containing said combustible material, passing the said stream into a cylindrical separator and under conditions adapted to impart a whirling motion to said stream in its travel through the separator, whereby the particles are projected against the wall of the separator and carried therealong; introducing a secondary stream of cooler gaseous fluid peripherally and spirally of the hot gaseous stream and co-flowing therewith, whereby a fluid cooling sheath is established along the wall of the separator and contains and cools the particles separated from the hot, core stream; discharging the primary, particle-free, hot core stream from the separator in a volume substantially equivalent to the inlet volume of the said core stream; and separately discharging the secondary stream, with the contained, cooled particles, from the separator.

3. Method according to claim 2 wherein the secondary cooling stream is introduced into the separator at a rate such that the forward travel of the resulting peripheral cooling envelope substantially approximates that of the hot core stream.

4. Method according to claim 3 wherein the weight of the secondary air required for effective cooling of combustible particles from the primary hot core stream, ranges from 5 to 20% of the weight of the primary stream.

5. Method according to claim 4 wherein with inlet temperatures of 850° F., and 77° F., respectively, for the primary and secondary gas streams, and the weight of the secondary gas stream approximating 15% of that of the primary gas stream, the outlet temperature of the secondary gas stream and contained combustible particles is approximately 400° F.

6. A separator of the class described comprising a closed cylindrical vessel, means for imparting rotation to a first, cool gas stream, and passing the said stream through the vessel and in contact with the wall thereof, means for imparting co-directional rotation to a second, particle-bearing hot gas stream, and passing the said second stream through the vessel in contact with the inner surface of said first rotating stream, whereby the particles in said second gas stream are transferred to the first said gas stream, and separate discharge means for said streams.

7. A separator of the class described comprising a closed cylindrical vessel, means for introducing a first gas stream tangentially into the vessel whereby to form a sheath stream in fluid contact with the wall of the vessel, means for introducing a second, particle-bearing core gas stream into the vessel, tangentially of the inner surface of the sheath stream and in contact therewith, whereby the streams are co-flowing and the particles are transferred from the core stream to the sheath stream, and separate discharge means for said streams.

8. A separator of the class described comprising a closed cylindrical vessel, means for introducing a first gas stream into the vessel whereby to form a spinning sheath stream in fluid contact with the wall of the vessel, means for introducing a second, particle-bearing spinning core gas stream into the vessel in contact with the inner surface of the sheath streams whereby the streams are co-flowing and co-spinning and the particles are transferred from the core stream to the sheath stream, and separate discharge means for said streams.

9. A separator for air-borne flammable dusts and the like, comprising a cylindrical housing, means associated with the inlet of the separator effective to impart rotative velocity to the primary air whereby the contained dusts are thrown towards the separator wall; means for introducing an enveloping, co-directional secondary, cooler air stream of much less volume than the primary stream, into the separator with a rotative velocity equivalent to that of the primary stream, whereby the separated dust is transferred to the secondary stream; a first discharge means for the stripped primary stream, and a second discharge means for the secondary stream and contained dusts.

10. Solids exchanger, particularly adapted for the transfer of material of the group comprising particulate solids and fluid droplets from a primary gas stream into a secondary stream at lower temperature, comprising a cylindrical casing, a primary gas inlet tube at one end of the casing, a supporting ring mounting the inlet tube in the said end of the casing and defining an annular chamber with said tube and casing, a secondary gas inlet discharging tangentially into the annular chamber; a primary gas outlet at the other end of the casing and coaxial with the primary gas inlet tube, the said primary gas outlet defining a second, annular chamber with the casing, facing the first said annular chamber, and a tangential secondary outlet for the second annular chamber.

11. The method of separating and cooling particulate solids and fluid droplets contained in a gaseous fluid, comprising establishing a primary stream of such material-bearing gaseous fluid and a secondary stream of a cooler, heavier gas; projecting the said primary stream against the said secondary stream, whereby the particulate material contained in the primary stream is projected and transferred into the secondary stream and cooled and asported thereby, and separating said streams.

12. Solids exchanger, particularly adapted for the transfer of material of the group consisting of particulate solids and fluid droplets from a primary gas stream into a secondary gas stream at a lower temperature, comprising a cylindrical casing, a primary gas inlet at one end of the casing adapted to impart spiral motion to the primary gas stream, the said inlet defining an annular chamber with the inner wall of the casing, a secondary gas inlet discharging tangentially into the said annular chamber; a primary gas outlet at the other end of the casing and coaxial with the primary gas inlet, the said primary gas outlet defining a second annular chamber with the casing, and a tangential secondary gas outlet from the second annular chamber.

13. The method of separating and cooling solid particles and fluid droplets contained in a first flowing stream of hot gaseous fluid by transfer of said particles and droplets from said first stream to a second, cooler gaseous stream, comprising juxtaposing the two streams in adjacent co-flowing parallel paths, imparting a substantially uniform rotational motion to the said two streams, with the said first, hot stream nearer to the center of rotation than the said second, cooler stream, whereby the particulate material is discharged, by centrifugal force, from the said first, hot stream to the said second, cooler stream, and thereafter separating the two streams.

JOHN I. YELLOTT.

References Cited in the file of this patent

UNITED STATES PATENTS

| Number | Name | Date |
| --- | --- | --- |
| 1,478,750 | McElroy | Dec. 25, 1923 |
| 2,005,305 | Wagner | June 18, 1935 |
| 2,252,531 | Saint-Jacques | Aug. 12, 1941 |
| 2,368,828 | Hanson et al. | Feb. 6, 1945 |
| 2,370,629 | Appeldorn | Mar. 6, 1945 |
| 2,542,549 | McBride | Feb. 20, 1951 |

FOREIGN PATENTS

| Number | Country | Date |
| --- | --- | --- |
| 52,024 | Netherlands | Jan. 16, 1942 |
| 105,056 | Sweden | May 21, 1942 |